US009112562B2

(12) United States Patent
Li et al.

(10) Patent No.: US 9,112,562 B2
(45) Date of Patent: Aug. 18, 2015

(54) TECHNIQUES UTILIZING ADAPTIVE CODEBOOKS FOR BEAMFORMING IN WIRELESS NETWORKS

(75) Inventors: Qinghua Li, San Ramon, CA (US); Hongming Zheng, Beijing (CN); Senjie Zhang, Beijing (CN); Xintian Eddie Lin, Palo Alto, CA (US); Shanshan Zheng, Beijing (CN); Guangjie Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 749 days.

(21) Appl. No.: 12/317,871

(22) Filed: Dec. 29, 2008

(65) Prior Publication Data

US 2010/0056216 A1  Mar. 4, 2010

Related U.S. Application Data

(60) Provisional application No. 61/093,699, filed on Sep. 2, 2008.

(51) Int. Cl.
*H04M 1/00* (2006.01)
*H04B 7/06* (2006.01)
*H04B 7/04* (2006.01)
*H04W 16/28* (2009.01)

(52) U.S. Cl.
CPC ............ *H04B 7/0617* (2013.01); *H04B 7/0434* (2013.01); *H04B 7/0456* (2013.01); *H04B 7/0641* (2013.01); *H04W 16/28* (2013.01); *H04B 7/0465* (2013.01); *H04B 7/0478* (2013.01)

(58) Field of Classification Search
CPC .. H04B 7/0639; H04B 7/0478; H04B 7/0617; H04B 7/0663; H04B 7/0456; H01Q 1/246; H04W 16/28; H04W 52/42
USPC ........... 455/19, 101, 63.4, 562.1, 63.1, 67.13, 455/67.16, 277.1; 370/334, 339, 320, 335, 370/343; 375/267, 304, 299, 347, 349
See application file for complete search history.

(56) References Cited

U.S. PATENT DOCUMENTS

| 6,650,881 | B1 * | 11/2003 | Dogan | 455/276.1 |
| 7,069,050 | B2 * | 6/2006 | Yoshida | 455/562.1 |
| 7,181,246 | B2 * | 2/2007 | Lo | 455/562.1 |
| 7,430,168 | B2 * | 9/2008 | Yamaura et al. | 370/230.1 |
| 7,778,826 | B2 * | 8/2010 | Lin et al. | 704/223 |

(Continued)

FOREIGN PATENT DOCUMENTS

| CN | 101127582 A | * | 7/2007 | 370/252 |
| CN | 101677251 A | | 3/2010 | |

(Continued)

OTHER PUBLICATIONS

International Preliminary Report on Patentability received for PCT Patent Application No. PCT/US2009/054136, mailed on Mar. 17, 2011, 6 pages.

(Continued)

*Primary Examiner* — Michael Faragalla
*Assistant Examiner* — Gerald Oliver
(74) *Attorney, Agent, or Firm* — Thorpe, North & Western LLP

(57) ABSTRACT

An embodiment of the present invention provides a method, comprising using an adaptive codebook for beamforming for communications in wireless networks.

20 Claims, 4 Drawing Sheets

(56) References Cited

U.S. PATENT DOCUMENTS

| | | | |
|---|---|---|---|
| 2003/0185309 A1* | 10/2003 | Pautler et al. | 375/257 |
| 2007/0174038 A1 | 7/2007 | Wang et al. | |
| 2007/0206626 A1 | 9/2007 | Lee et al. | |
| 2008/0080449 A1* | 4/2008 | Huang et al. | 370/342 |
| 2008/0094281 A1* | 4/2008 | Teng et al. | 342/368 |
| 2008/0240274 A1* | 10/2008 | Han et al. | 375/260 |
| 2009/0274230 A1* | 11/2009 | Heath et al. | 375/260 |
| 2009/0298424 A1* | 12/2009 | Liu et al. | 455/39 |
| 2009/0323849 A1* | 12/2009 | Bala et al. | 375/267 |
| 2011/0064156 A1* | 3/2011 | Kim et al. | 375/267 |

FOREIGN PATENT DOCUMENTS

| | | |
|---|---|---|
| EP | 2321911 | 4/2011 |
| JP | 2011516126 A | 5/2011 |
| JP | 2011525080 A | 9/2011 |
| KR | 10-2001-0036597 A | 5/2001 |
| KR | 10-2002-0089094 A | 11/2002 |
| TW | 201021455 A | 6/2010 |
| WO | WO 2007/022330 A2 | 2/2007 |
| WO | WO 2007/024959 A2 | 3/2007 |
| WO | 2007050861 A2 | 5/2007 |
| WO | 2009157715 A2 | 12/2009 |
| WO | 2010/027647 A1 | 3/2010 |
| WO | 2010027647 A1 | 3/2010 |
| WO | 2010/027647 A8 | 10/2010 |

OTHER PUBLICATIONS

International Search Report and Written Opinion received for PCT Patent Application No. PCT/US2009/054136, mailed on Dec. 30, 2009, 11 pages.

Kim, et al. "Optimizing Codebook for Quantized Precoder Using Steepest Descent Method Considering Codeword Quantization", Korea Information & Communications Society, vol. 33, Jul. 2006, pp. 564-567.

Adaptive codebook for beamforming in limited feedback MIMO systems, Information Sciences and Systems, CISS 2008. 42nd Annual Conference, 994-998, Kiarash, A, et al., Mar. 21, 2008.

Office Action received for Korean patent application No. 10-2011-7005021 mailed on Jun. 27, 2012, 8 pages of Office Action including 5 pages of English translation.

Office Action received for Japanese patent application No. 2011-525080 mailed on Sep. 18, 2012, 9 pages of Office Action including 5 pages of English translation.

Office Action received for European patent application No. 09811943.1 mailed on Apr. 11, 2011, 2 pages.

Office Action received for Chinese patent application No. 200910173609.8 mailed on Feb. 29, 2012, 8 pages of Office Action including 3 pages of English translation.

Office Action Received for Application Serial No. 200910173609.8 on Sep. 2, 2009, 13 pages (8 pages of Translation), 13 pgs.

International Preliminary Report on Patentability received for PCT/US2009/054136 on Mar. 17, 2011, 8 pages.

International Search Report and Written Opinion received Dec. 30, 2009, for PCT Application Serial No. PCT/US2009/054136, 11 pages.

Office Action received for Korean Patent Application 10-2011-7005021, mailed on Dec. 21, 2012, 9 pages of Office Action including 4 pages of English translation.

Office Action received for Taiwan Patent Application 98128665, mailed on Jan. 10, 2013, 6 pages of Office Action including 4 pages of English translation.

Office Action received for Japan Patent Application No. 2011-525080, mailed on Mar. 12, 2013, 4 pages of Office Action, including 2 pages of English translation.

Office Action received for Korean Patent Application No. 10-2011-7005021, mailed on May 20, 2013, 5 pages of Office Action including 2 pages of English translation.

Office Action Received for Taiwan Patent Application No. 98128665, mailed on Dec. 19, 2013, 6 pages of Office Action including 1 page of Search Report.

De Francisco, et al.; Beaforming for Correlated Broadcast Channels with Quantized Channel State Information; Signal Processing Advances in Wireless Communications; Jul. 2008; pp. 161-165; SPAWC 2008 IEEE $9^{TH}$ Workshop on Signal Processing Advances in Wireless Communications 2008; IEEE.

Mondal et al.; Channel Adaptive Quantization for Limited Feedback MIMO Beaforming Systems; IEEE Transactions on Signal Processing; Dec. 2006; pp. 4717-4729; vol. 54, No. 17; IEEE.

Samanta et al.; Codebook Adaptation for Quantized MIMO Beaforming Systems; Sigmnals, Systems and Computers; Oct. 2005; pp. 376-380; Conference Record of the Thirty-Ninth Asilomar Conference on Signals, Systems and Computers 2005; IEEE.

EP application 09811943.1; filed May 12, 2011; Intel Corporation; European Search Report datd Oct. 28, 2014.

* cited by examiner

US 9,112,562 B2

TECHNIQUES UTILIZING ADAPTIVE CODEBOOKS FOR BEAMFORMING IN WIRELESS NETWORKS

CROSS REFERENCED TO RELATED APPLICATIONS

This application claims the benefit under 35 U.S.C. §119 (e) to U.S. Provisional Patent Application No. 61/093,699, filed Sep. 2, 2008 and is hereby incorporated by reference in its entirety.

BACKGROUND

In closed-loop multiple input multiple output (MIMO) beamforming, a subscriber station (SS) quantizes the ideal beamforming matrix and sends the quantization index back to a base station (BS). The BS reconstructs the beamforming matrix according to the feed back index and conducts the beamforming. It is well known that the beamforming increases the link performance and system throughput.

Although the present invention is not limited in this respect, in 802.16e (WiMAX), the ideal beamforming matrix is quantized by a constant quantization codebook. The codebook is optimized for a single channel scenario, where the transmit antenna correlation at the BS is zero. However, the transmit antenna correlation is not constantly zero in reality and varies with several factors such as the antenna spacing at the BS, the BS antenna height, LOS/NLOS condition, BS and SS separation. Furthermore, the optimal quantization codebook varies with the antenna correlation, and thus it is desirable to adapt the codebook to the correlation. For example, the discrete Fourier transform (DFT) codebook and the 802.16e codebook are optimized for either the high or the low antenna correlations but not both. Fortunately, the antenna correlation varies very slowly as compared to the short-term channel fading, and there is a feedback mechanism for long term information in 802.16e.

Thus, a strong need exists for techniques utilizing adaptive codebooks for beamforming in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1a provides a quantization constellation for the off-diagonal entry of $R_t$, which has a point at (0,0) for uncorrelated channels of embodiments of the present invention;

FIG. 2a provides a quantization constellation for the off-diagonal entry of $R_t$, which is dedicated for correlated channels of embodiments of the present invention;

Figure 1:
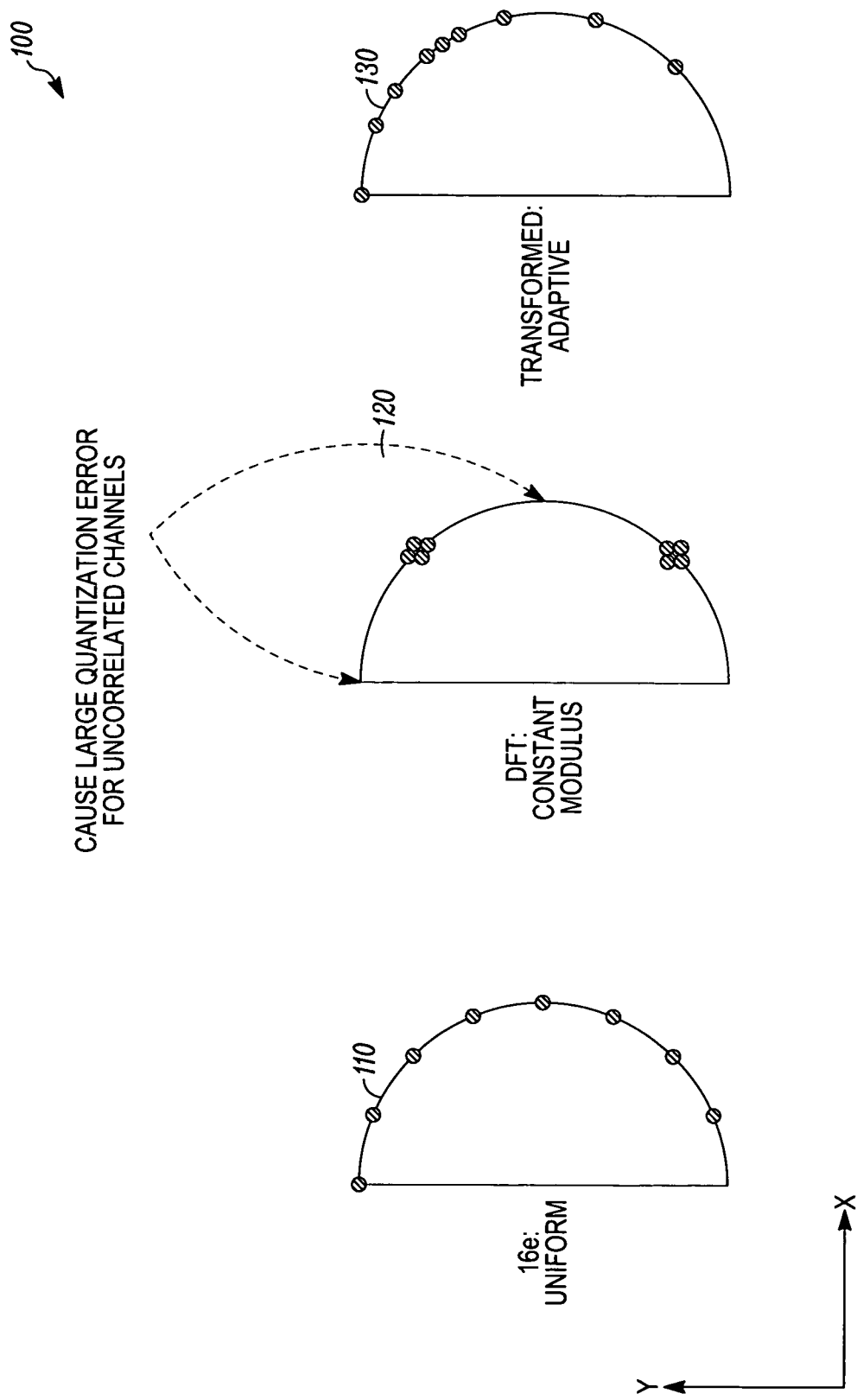
FIG. 1 illustrates codeword distributions of IEEE 802.16e, DFT, and transformed codebooks.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide an adaptive codebook varying with the antenna correlation. Both a BS and a SS transform the 802.16e codebooks synchronously to generate a new quantization codebook optimized for the BS antenna correlation. Simulation results demonstrate that the codebook of embodiments of the present invention uniformly outperforms the competitor codebooks for all antenna correlation. Furthermore, the codebook of the present invention has almost the same performance of the optimal codebooks that are optimized for each given antenna correlation. Finally, the transformation of embodiments of the present invention provides a backward compatible solution to 802.16e and further the 802.16e codebook.

In closed-loop MIMO beamforming, a subscriber station (SS) quantizes the ideal beamforming matrix and sends the quantization index back to a base station (BS). The BS reconstructs the beamforming matrix according to the feed back index and conducts the beamforming. As mentioned in above, it is well known that the beamforming increases the link performance and system throughput.

In IEEE 802.16e (WiMAX), the ideal beamforming matrix is quantized by a constant quantization codebook. The codebook is optimized for a single channel scenario, where the transmit antenna correlation at the BS is zero. However, the transmit antenna correlation is not constantly zero in reality and varies with several factors such as the antenna spacing at the BS, the BS antenna height, LOS/NLOS condition, BS and SS separation. Furthermore, the optimal quantization codebook varies with the antenna correlation, and thus it is desirable to adapt the codebook to the correlation. For example, present DFT codebooks and 802.16e codebooks are optimized for either one of the high and low antenna correlations but not both. Fortunately, the antenna correlation varies very slowly as compared to the short-term channel fading. The feedback of the correlation costs little system overhead because (unlike beamforming matrix feedback varying for each subband) it remains the same for the whole frequency band and is fed back infrequently say in every 100 ms.

Embodiments of the present invention provide an adaptive codebook varying with the antenna correlation. Both BS and SS transform the 802.16e codebooks synchronously to generate a new quantization codebook optimized for the BS antenna correlation.

The 802.16e codebook is designed for zero antenna correlation, where the ideal beamforming matrix is uniformly distributed. Consequently, the quantization codeword matrix (or vector) is uniformly distributed over quantization spaces. Since the beamforming in an 802.16e system is only for a single user MIMO in long distance (and NLOS) case, the antenna correlation is typically close to zero. However, for WiMAX 2, more transmit antennas (up to 8) and closer antenna mounting (half wavelength) are considered, although the present invention is not limited in this respect. Therefore, the antenna correlation is not zero for some cases while it is close to zero for the others. For example, multi-user MIMO (or downlink SDMA) works well in small antenna spacing while single user MIMO prefers large antenna spacing.

It is undesirable to define multiple codebooks for the different antenna correlations. Embodiments of the present invention provide a universal solution and can transform codebooks adaptively for all antenna correlations. The transformation is a simple function of the antenna correlation.

The present inventions adaptive codebook can be viewed from a differential perspective. The antenna correlation matrix varies very slowly and it carries the average beamforming directions of the strongest received signals. Furthermore, the distribution of the instantaneous beamforming directions concentrates at the average beamforming directions as the correlation increases. Instead of uniformly spreading the quantization codewords, embodiments of the present invention transform the uniform codebook so that the codewords concentrate at the average directions for reducing quantization error.

The idea of the adaptive codebook is illustrated generally as 100 of FIG. 1 by an example as compared to the other two codebooks. In the example, the channel is a 2x1 real channel with two transmit and one receive antennas. The codewords of the 16e codebook 110 uniformly distribute over a semicircle. In contrast, the DFT codebook 120 only has two valid codewords $$\frac{1}{\sqrt{2}}(1, 1) \text{ and } \frac{1}{\sqrt{2}}(1, -1)$$

due to the constant modulus constraint and leaves big holes in the quantization space. For an uncorrelated channel, the input to the quantizer, i.e. the ideal beamforming matrix, uniformly distributes over the semicircle and thus matches the codeword distribution of the 802.16e codebook. For a highly correlated channel, the channel response magnitude of each transmit antenna has almost the same value and therefore the entry magnitude of the ideal beamforming matrix also has almost the same value. This matches the codeword distribution of the DFT codebook. This explains how two codebooks 110 and 120 work for the two extreme scenarios but not both. Besides the magnitude information used in the DFT codebook, the adaptive codebook 130 further exploits the phase information obtained from the antenna correlation. The adaptive codebook 130 transforms the quantization codewords to the preferable direction where the input beamforming matrix will mostly likely be present. The relocated codewords match the input distribution of the beamforming matrix and thus reduce the quantization error.

Signal Model

The baseband signal model is given by $$y = HVs + n, \quad (1)$$

where n is the complex AWGN with variance $N_0$; s is the $N_s$ by 1 transmitted vector with unit power; $N_s$ is the number of spatial streams; y is the received vector; H is the channel matrix of size $N_r$ by $N_t$; V is the beamforming matrix (or vector) of size $N_t$ by $N_s$. In Rayleigh fading channel, the correlated channel matrix H is generated from the channel matrix $H_w$ with independent, identically distributed (i.i.d.) entries as $$H = R_r^{1/2} H_w R_t^{1/2}, \quad (2)$$

where $R_r$ is the $N_r$ by $N_r$ receive covariance matrix and $R_t$ is the $N_t$ by $N_t$ transmit covariance matrix. The transmit covariance matrix may be defined as $$R_t = \frac{1}{Tr(R_r)} E(H^H H)$$

in theory or be simply computed as the empirical mean of $H^H H$ over channel matrix samples Hs in practice. Since the SS antenna height is low with respect to the surrounding objects, $R_r$ can be approximated by the identity matrix. Therefore, (2) can be simplified as $$H = H_w R_t^{1/2}. \quad (3)$$

Let the singular value decomposition of $R_t$ be $$R_t = Q\Sigma^2 Q^H, \quad (4)$$

where Q is an $N_t$ by $N_t$ unitary matrix i.e. $Q^H Q = I$; $\Sigma$ is the diagonal matrix with the square roots of the singular values $\sigma_i$ for $i = 1, \ldots, N_t$ in decreasing order $\sigma_i \geq \sigma_{i+1}$. Note that the power of $R_t$ in (3) can be written as $R_t^{1/2} = Q\Sigma^i Q^H$. Equation (2) is a simplified channel model of correlated channels, where the correlations at the transmitter and the receiver are decoupled and are modeled by two separate matrixes $R_r$ and $R_t$. For the case where the decoupling is invalid, the correlation matrix of channel matrix entries is defined as $R_H = E(\text{vec}(H)\text{vec}(H)^H)$, where $\text{vec}(X)$ stacks the columns of matrix X to make a long column vector.

In Ricean fading channel, a line-of-sight (LOS) component $\overline{H}$ is added to (2) as $$H = \overline{H} + R_r^{1/2} H_w R_t^{1/2}. \quad (5)$$

The transmit covariance matrix is defined as $$R_t = \frac{1}{Tr(R_r)} E\left((H - \overline{H})^H (H - \overline{H})\right). \quad (6)$$

Codebook Transformation

Denote the quantization codebook with uniformly distributed codewords as $C^{unif}$ and its codewords as $V_i$ for $i=1, \ldots, N_c$. We would like to transform the uniform codebook to generate a new codebook for the correlated channels.

The present invention derived the distribution of the ideal beamforming matrix for correlated channels with known $R_t$. Using the derived input distribution, for very high resolution codebooks with many codewords, we can derive the asymptotically optimal transformation that minimizes the channel capacity loss. However, since the transformation requires high complexity functions such as hypergeometric function, it is not practical for the implementation on the mobile device. We simplify the transformation and maintain a performance very close to the optimal. The transformation takes the form of $$\tilde{V}_i = \text{orth}(FV_i), \quad (7)$$

where $\tilde{V}_i$ is the i-th codeword of the new codebook; orth(X) converts the input matrix (or vector) X to an orthogonal matrix with orthonormal column(s) that span the same subspace as X's columns; F is a $N_t$ by $N_t$ transformation matrix. orth(X) is essentially the orthogonalization of X and can be simply implemented by various methods such as Grant-Schmidt and QR decomposition. The transformation matrix F may be a function of $R_H, R_t, R_r, \bar{H}, Q, \Sigma, N_t, N_s, N_r$, and signal to noise ratio (or $N_0$). In the following we take the unitary precoding as example for explanation but it also can have the same application for non-unitary precoding.

Embodiments of the present invention provide three representations of transformation matrix F.

For practicality, F takes the polynomial form $$F = \alpha_0 \bar{H}^H \bar{H} + \sum_{i=1} \alpha_i R_t^{\frac{i}{K}}, \quad (8)$$

where $\bar{H}^H \bar{H}$ contains the beamforming direction of the LOS components; $\alpha_0$ may be zero for Rayleigh fading channels; $\alpha_i$ may be a function of the signal to noise ratio (SNR) denoted by $\gamma$; K may be an integer e.g. 2 or 4; i is an integer variable. For low SNR, since it is desirable to have a slightly greater contribution from the high order term of $R_t^{i/K}$ in (6), the weight coefficient $\alpha_i$ may increase as $\gamma$ decreases e.g. $\alpha_i = \gamma^{-i}$. For simplicity, a constant expression may be used for all γs per combination of $N_t, N_s, N_r$. For example, $$F = R_t \quad (9)$$

may be used for all cases.

The l-th power of $R_t$ has a general form $$R_t^l = Q \Sigma Q_a, \quad (9.1)$$

where $Q_a$ can be any $N_t$ by $N_t$ unitary matrix. Because of this, (8) and (9) have various forms for different choices of $Q_a$s. When $Q_a = Q^H$, the decomposition of $R_t$ in (4) gives another way to write (8) as $$F = \alpha_0 \bar{H}^H \bar{H} + \sum_{i=1} \alpha_i Q \Sigma^{\frac{2i}{K}} Q^H \text{ for Ricean fading} \quad (10)$$

and $$F = \sum_{i=1} \alpha_i Q \Sigma^{\frac{2i}{K}} Q^H \text{ for Rayleigh fading}, \quad (11)$$

where Q contains the global and local maximums of the ideal beamforming directions for Rayleigh fading channels. If the original codebook for the transformation is uniformly distributed, then the rotation of $Q^H$ in (10) and (11) can be dropped i.e. $Q_a = I$ and the simplified transformation F is $$F = \alpha_0 \bar{H}^H \bar{H} + \sum_{i=1} \alpha_i Q \Sigma^{\frac{2i}{K}} \text{ for Ricean fading} \quad (12)$$

and $$F = \sum_{i=1} \alpha_i Q \Sigma^{\frac{2i}{K}} \text{ for Rayleigh fading}, \quad (13)$$

It should be noted that $R_t^{1/2}$ has a general form $R_t^{1/2} = Q \Sigma Q_a$, where $Q_a$ can be any $N_t$ by $N_t$ unitary matrix. The Cholesky decomposition form of $R_t^{1/2}$, which is a triangular matrix, is a special case of the general form.

In sum, the simplified codebook transformation can be written as $$\tilde{V}_i = \text{orth}(R_t^l V_i) \quad (14)$$

or equivalently $$\tilde{V}_i = \text{orth}(Q \Sigma^{2l} V_i), \quad (15)$$

where Q and $\Sigma$ are computed from the long term CSI; $\tilde{V}_i$ is the transformed codeword; and $V_i$ is codeword of the original codebook. Q consists of the favorable, long term beamforming directions and $\Sigma$ specifies the concentration to those directions. For implementation simplicity, since l=1 delivers good performance for all cases and it doesn't require computing the rational power of $R_t$, the simplest form of transformation is $$\tilde{V}_i = \text{orth}(R_t V_i). \quad (16)$$

For feedback reduction, the receiver may not feed back the correlation matrix $R_t$. Instead, it may feed back only part of Q and $\Sigma$. For example, it may feed back the first $N_s$ columns of Q and the first $N_a$ eigenvalues of $\Sigma$. The transmitter can add complementary and orthogonal columns to the fed back columns to approximate Q and use small values e.g. the minimum of the fed back eigen values to replace the not fed back eigenvalues of $\Sigma$. Furthermore, differential technique can be applied to the feedback of $R_t$ or its equivalents.

In the practical system the suitable representation could be chosen based on the balance between the performance, feedback overhead and complexity.

The adaptive codebook can be applied to both one-shot and differential feedbacks. The description above is for one-shot feedback. The differential feedback has the form [3][4]

$$V(t+1) = Q(V(t))D_i, \quad (17)$$

where V(t) and V(t+1) are the beamforming matrices at time t and t+1; Q(V(t)) is a square rotation matrix that rotates V(t) to V(t+1) using $D_i$. $D_i$ is selected from a so called "differential codebook" and the index of $D_i$ is fed back from the receiver to the transmitter. The codewords of the differential codebook usually do not uniformly distribute. Instead, they center on somewhere e.g. the identity matrix. The concentration of the codewords increases as the correlation. Therefore, the differential codebook can adapt to the correlation as the one-shot codebook did using (7). A simple example of the transformation is $$\tilde{D}_i = \text{orth}(\Sigma^l D_i), \quad (18)$$

where $\Sigma$ is computed from the long term CSI; l is some number depending on $N_t, N_s, N_r, \gamma$, and mobile speed; $\tilde{D}_i$ is the transformed codeword; and $D_i$ is the codeword of the original codebook.

Variants with Low Complexities

Since the orth( ) operation increases complexities at the subscriber station, we devise some variants of the original scheme above. The first variant is the simplest. The SS simply removes the orth( ) operation and directly uses the unorthogonalized matrix $FV_i$ to select codeword and feeds back codeword index.

The second variant is as follows. The SS doesn't transform the codebook. Instead, it transforms the channel matrix H and uses the uniform codebook (e.g. 16e codebook) to quantize the ideal beamforming matrix of the transformed channel matrix $\tilde{H}$ as $$\tilde{H} = HT_H. \tag{19}$$

When $T_H = R_t^{-1/2}$, the correlation in H expressed in (3) is removed and $\tilde{H}$ becomes uncorrelated, whose distribution matches the uniform codebook. In general, we may let $T_H = Q\Sigma^{-l_t}$ for some positive number $l_t$. The transmitter receives the fed back index and lookups the codeword $V_i$ from the uniform codebook. The codeword of the original codebook is then transformed to the actual one as $$\tilde{V}_i = \text{orth}(T_H^{-H} V_i). \tag{15}$$

Now, most of the computation burden is shifted to the BS.

Quantization of Transformation Matrix

The receiver may feed back the transformation matrix in various forms. For example, it may send back the upper triangle of $R_t^{l_2}$ for some number $l_2$ e.g. $l_2=1$. A scalar quantization may be applied. For example, when $F=R_t$ is used, since $R_t$ is Hermitian, only the upper (or lower) triangle of $R_t$ is quantized entry by entry. Before quantization, $R_t$ is scaled by the maximum number on the diagonal as $$\tilde{R}_t = \frac{1}{r_{ii,max}} \tilde{R}_t$$

and the maximum number on the diagonal is normalized to unity. Since the diagonal of $R_t$ is real and positive, 1 quantization bit may be sufficient and the diagonal entry may be quantized to either 1 or 0.8. The off-diagonal entry of $R_t$ is usually complex and requires 4 quantization bits per entry. The 16 points of the quantization constellation may be allocated within the unit circle. One example, although not limited to this example, is shown in FIG. 1a, generally as 100a. The constellation points are located on two circles with radiuses 0.4 and 0.9, respectively. A single point sits at (0,0) and this point is dedicated to the accurate quantization for uncorrelated and slightly correlated channels. In this case, the transformation operation may be always on regardless of the actual channel correlation scenarios, i.e. correlated or uncorrelated. Another non-limiting illustrative example is shown generally as 200a of FIG. 2a. The constellation is only for correlated channels because the system may only use the original (uniform) codebook and turn off the transformation operation for uncorrelated channels where the transformation can not help. No point is located at (0,0). The points all have norms greater than 0.3. There may be more points at the outer part of the constellation than at the inner part. For a third example, when $$F = R_t^{\frac{1}{2}}$$

is used and $$R_t^{\frac{1}{2}}$$

is computed by Cholesky decomposition, similar scalar quantization scheme can be applied to the upper triangle of $$R_t^{\frac{1}{2}}$$

that is an upper triangular matrix.

Simulation Results

Figure 2:
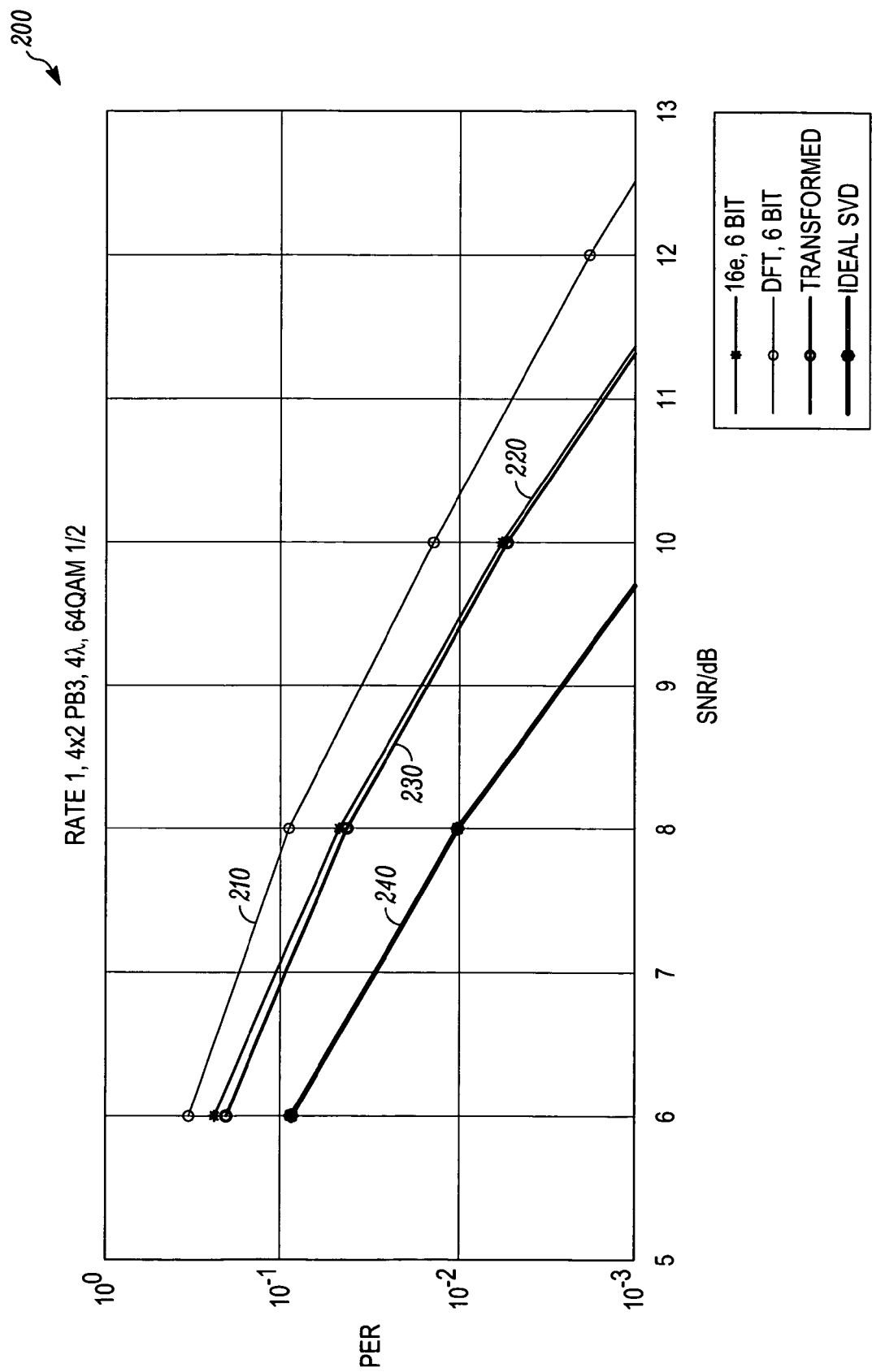
FIG. 2 illustrates packet error rates of three codebooks with low antenna correlation: 802.16e, DFT and an adaptive codebook according to embodiments of the present invention.
Figure 3:
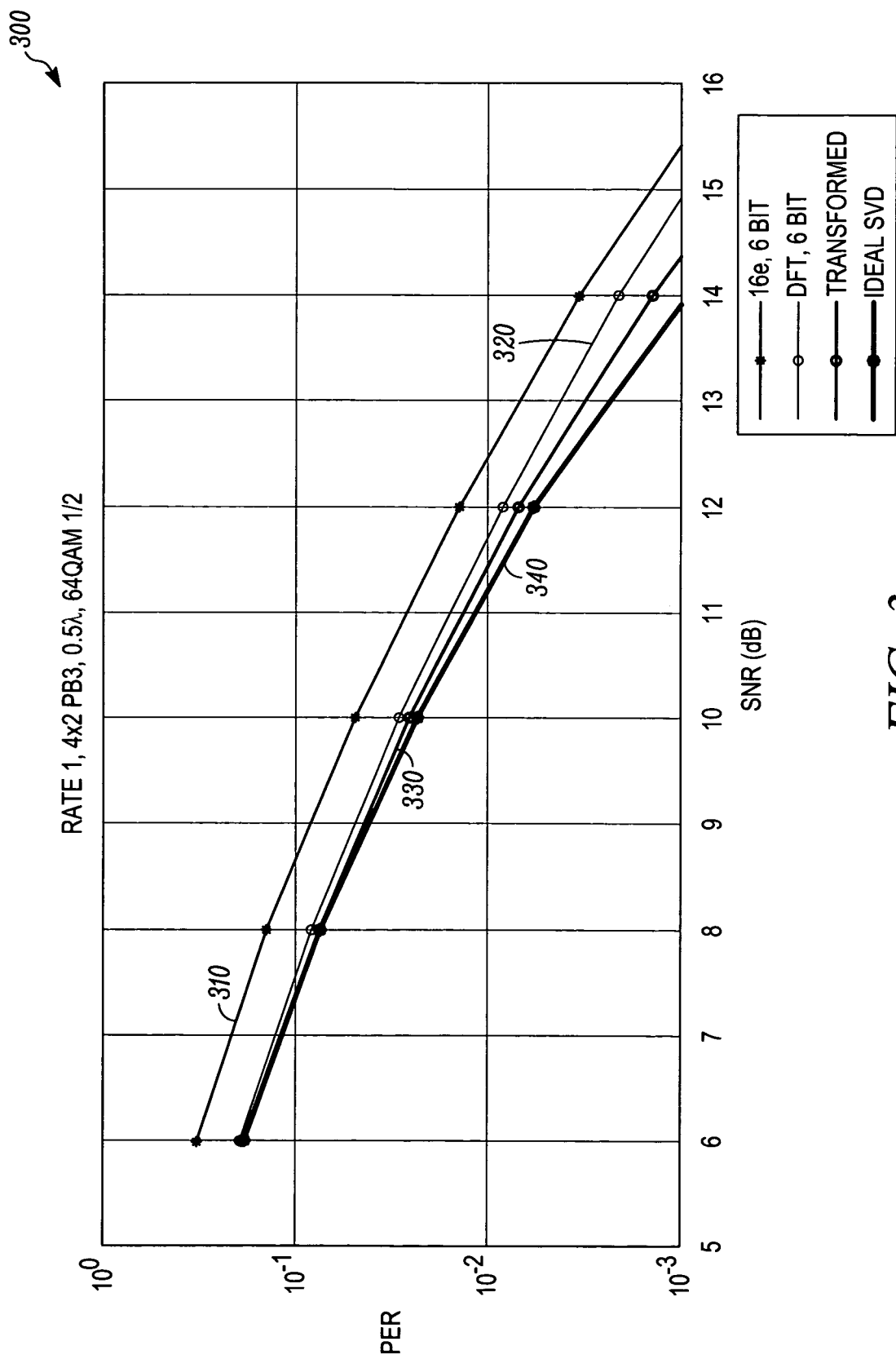
FIG. 3 illustrates packet error rates of three codebooks with high antenna correlation: 802.16e, DFT and the proposed adaptive codebook according to one embodiment of the present invention.

Some of the link level results are shown generally as 200 of FIG. 2 for a low correlation case and generally as 300 of FIG. 3 for a high correlation case. The channel model is ITU Pedestrian B. The BS has four transmit antennas and the SS has two receive antennas. The antenna spacings of BS transmit antennas are 4 wavelengths and 0.5 wavelength for practical mounting with low and high correlations. One data stream is transmitted. Modulation and code rate are 64QAM and 0.5. Three codebooks are tested. The first one is a conventional 802.16e codebook 220 (low correlation) 320 (high correlation); the second is the DFT codebook 210 (low correlation) 310 (high correlation); and the third one is the adaptive codebook 230 (low correlation) 330 (high correlation) from embodiments of the present invention. The ideal SVD is shown at 240 (low correlation) 340 (high correlation). For both low and high correlation cases, the proposed adaptive codebook has the best performances. These performances are very close to those of the optimal codebooks. The optimal codebook for zero correlation is the 16e codebook that is almost the optimal for low correlation case. Since the adaptive codebook is even slightly better than the 16e codebook, the adaptive codebook has a performance very close to that of the optimal codebook. Further, the adaptive codebook has a performance very close to the ideal performance with infinite number of feedback bits, which is even better than that of the optimal codebook, for high correlation case. For low correlation case, the DFT codebook has the poorest performance. However, for high correlation case, the DFT codebook outperforms the 802.16e codebook by about one dB.

Figure 4:
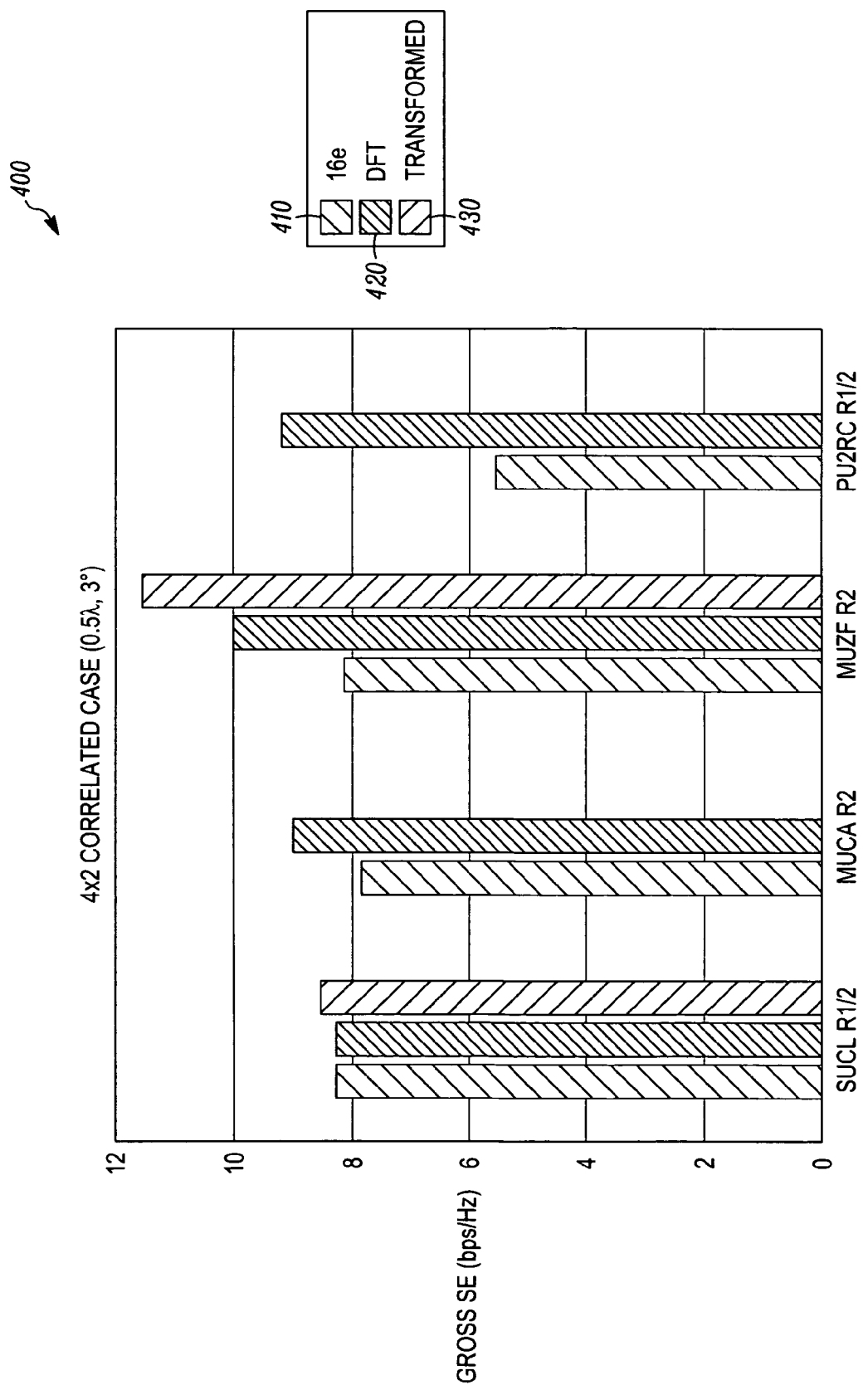
FIG. 4 illustrates throughput comparisons of the three codebooks in single-user MIMO and various multiuser MIMO schemes.

Some of the system level results are shown as 400 of FIG. 4 for a high correlation case. 802.16e is depicted as 410, DFT as 420 and transformed at 430. The legend "MUZF" stands for multi-user zero-forcing scheme and "SUCL" stands for single-user closed-loop MIMO scheme. Same as the link level results, the proposed adaptive codebook has the best performance with throughputs gain over the competitor DFT codebook for both MIMO schemes While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method, comprising:
    using an adaptive codebook for beamforming for communications in wireless networks, wherein phase information obtained from antenna correlation is used to transform the adaptive codebook by transforming a quantization matrix of the adaptive codebook to an expected direction of an input beamforming matrix, thereby allowing the adaptive codebook to vary with antenna correlation, wherein said adaptive codebook transformation takes the form: $\tilde{V}_i = \text{orth}(FV_i)$, where $\tilde{V}_i$ is the i-th codeword of a new codebook, $\tilde{V}_i$ is the codeword of an original codebook, orth (X) converts the input matrix (or vector) X to an orthogonal matrix with orthonormal column(s) that span the same subspace as X's columns, and F is a $N_t$ by $N_t$ transformation matrix.

2. The method of claim 1, wherein said adaptive codebook is transformed from a codebook so that the codewords concentrate at average directions for reducing quantization error.

3. The method of claim 1, further comprising using a base station (BS) and a subscriber station (SS) for said communications in said wireless networks and wherein said BS and SS transform codebooks synchronously to generate a new quantization codebook optimized for BS antenna correlation.

4. The method of claim 1, wherein a representation for F of said codebook transformation takes a polynomial form $$F = \alpha_0 \overline{H}^H \overline{H} + \sum_{i=1} \alpha_i R_t^{\frac{i}{K}}$$

and said codebook transformation is approximated as $\tilde{V}_i = \text{orth}(R_t^i V_i)$ or $\tilde{V} = \text{orth}(R_t V_i)$, wherein $\overline{H}^H \overline{H}$ contains the beamforming direction of the LOS components, $\alpha_0$ is zero for Rayleigh fading channels, $\alpha_i$ is a function of the signal to noise ratio (SNR) denoted by $\gamma$, K may be an integer value 2 or 4, i is an integer variable, $R_t$ is a $N_t$ by $N_t$ transmit covariance matrix.

5. The method of claim 4, wherein said transmit covariance matrix $R^t$ is quantized entry by entry and wherein diagonal entries are quantized as positive numbers and the off-diagonal entries in the upper or lower triangle are quantized as complex numbers.

6. The method of claim 4, wherein an l-th power of $R_t$ has a general form $$R_t^l = Q \Sigma^{2l} Q_a,$$

where $Q_a$ is any $N_t$ by $N_t$ unitary matrix, $R_t$ is a $N_t$ by $N_t$ transmit covariance matrix, Q includes global and local maximums of an ideal beamforming directions for Rayleigh fading channels, and $\Sigma$ specifies a concentration to the ideal beamforming directions.

7. The method of claim 6, wherein when $Q_a = Q^H$, $$F = \alpha_0 \overline{H}^H \overline{H} + \sum_{i=1} \alpha_i Q \Sigma^{\frac{2i}{K}} Q^H \text{ for Ricean fading}$$

and $$F = \sum_{i=1} \alpha_i Q \Sigma^{\frac{2i}{K}} Q^H \text{ for Rayleigh fading,}$$

where $\overline{H}^H \overline{H}$ contains the beamforming direction of the LOS components, $\alpha_0$ is zero for Rayleigh fading channels, $\alpha_i$ is a function of the signal to noise ratio (SNR) denoted by $\gamma$, K may be an integer value 2 or 4, and i is an integer variable.

8. The method of claim 7, wherein if an original codebook for said transformation is uniformly distributed, then a rotation of $Q^H$ is dropped and the simplified transformation F is $$F = \alpha_0 \overline{H}^H \overline{H} + \sum_{i=1} \alpha_i Q \Sigma^{\frac{2i}{K}} \text{ for Ricean fading}$$

and $$F = \sum_{i=1} \alpha_i Q \Sigma^{\frac{2i}{K}} \text{ for Rayleigh fading, and}$$

wherein $R_t^{1/2}$ has a general form $R_t^{1/2} = Q \Sigma Q_a$, where $Q_a$ is any $N_t$ by $N_t$ unitary matrix.

9. The method of claim 8, wherein a Cholesky decomposition form of $R_t^{1/2}$ is a triangular matrix and a special case of a general form.

10. The method of claim 6, wherein a simplified codebook transformation is represented as $\tilde{V}_i = \text{orth}(R_t^i V_i)$ or equivalently $\tilde{V}_i = \text{orth}(Q\Sigma^{2i} V_i)$, where Q and $\Sigma$ are computed from the long term CSI, $\tilde{V}_i$ is a transformed codeword, and $V_i$ is codeword of the original codebook.

11. The method of claim 10, wherein Q consists of favorable, long term beamforming directions and $\Sigma$ specifies the concentration of the favorable, long term beamforming directions, and a simplest form of transformation is: $\tilde{V}_i = \text{orth}(R_t V_i)$.

12. The method of claim 1, wherein a representation for F of said codebook transformation takes a polynomial form $$F = \alpha_0 \overline{H}^H \overline{H} + \sum_{i=1} \alpha_i Q \Sigma^{\frac{2i}{K}}$$

and said codebook transformation is approximated as $\tilde{V}_i = \text{orth}(Q\Sigma^1 V_i)$ or $\tilde{V}_i = \text{orth}(Q\Sigma^2 V_i)$, wherein $\overline{H}^H \overline{H}$ contains the beamforming direction of the LOS components, $\alpha_0$ is zero for Rayleigh fading channels, $\alpha_i$ is a function of the signal to noise ratio (SNR) denoted by $\gamma$, K may be an integer value 2 or 4, i is an integer variable, Q includes favorable, long term beamforming directions, and $\Sigma$ specifies a concentration to favorable, long term beamforming directions.

13. The method of claim 1, wherein said SS transforms a channel matrix and uses a uniform codebook to quantize an ideal beamforming matrix of said transformed channel matrix $\tilde{H}$ as $\tilde{H} = HT_H$, and when $T_H = R_t^{-1/2}$, a correlation in H is removed and $\tilde{H}$ becomes uncorrelated, where a distribution of H matches said uniform codebook.

14. The method of claim 1, wherein said wireless network is a wireless metropolitan area network.

15. An apparatus, comprising:
a transceiver which uses an adaptive codebook for beamforming for communications in wireless networks, wherein:
phase information obtained from antenna correlation is used to transform the adaptive codebook by transforming a quantization matrix of the adaptive codebook to an expected direction of an input beamforming matrix, thereby allowing the adaptive codebook to vary with antenna correlation;
said adaptive codebook is transformed from a codebook so that the codewords concentrate at average directions for reducing quantization error; and
said adaptive codebook transformation takes the form: $\tilde{V}^i = \text{orth}(FV^i)$, where $\tilde{V}^i$ is the i-th codeword of a new codebook, $V^i$ is the codeword of an orthogonal matrix with orthonormal column(s) that span the same subspace as X's columns, and F is a $N^t$ by $N^t$ transformation matrix;

a base station (BS) and a subscriber station (SS) for said communications in said wireless networks and wherein said BS and SS transform codebooks synchronously to generate a new quantization codebook optimized for BS antenna correlation; and wherein said SS transforms a channel matrix and uses a uniform codebook to quantize an ideal beamforming matrix of said transformed channel matrix $\tilde{H}$ as $\tilde{H}=HT_{\tilde{H}}$ and when $T_{\tilde{H}}=R_t^{-1/2}$, a correlation in H is removed and $\tilde{H}$ becomes uncorrelated, whose distribution matches said uniform codebook.

16. The apparatus of claim 15, wherein said transceiver is used in a base station operable for communications in a wireless metropolitan area network.

17. The apparatus of claim 15, wherein said transceiver is used in a subscriber station operable for communications in a wireless metropolitan area network.

18. The apparatus of claim 15, wherein a representation for F of said codebook transformation takes a polynomial form $$F = \alpha_0 \overline{H}^H \overline{H} + \sum_{i=1} \alpha_i R_t^{\frac{i}{K}}$$

and said codebook transformation is approximated as $\tilde{V}_i=\text{orth}(R_t^i V_i)$ or $\tilde{V}_i=\text{orth}(R_t V_i)$, wherein $\overline{H}^H \overline{H}$ contains the beamforming direction of the LOS components, $\alpha_0$ is zero for Rayleigh fading channels, $\alpha_i$ is a function of the signal to noise ratio (SNR) denoted by $\gamma$, K may be an integer value 2 or 4, i is an integer variable, $R_t$ is a $N_t$ by $N_t$ transmit covariance matrix.

19. A non-transitory machine-accessible medium that provides instructions, which when accessed, cause a machine to perform operations comprising:

creating an adaptive codebook for beamforming for communications in wireless networks, wherein phase information obtained from antenna correlation is used to transform the adaptive codebook by transforming a quantization matrix of the adaptive codebook to an expected direction of an input beamforming matrix, thereby allowing the adaptive codebook to vary with antenna correlation; and wherein said adaptive, codebook transformation takes the form $\tilde{V}_i=\text{orth}(FV_i)$, where $V_i$ is the i-th codeword of a new codebook, $V_i$ is the codeword of an original codebook, orth (X) converts the input matrix (or vector) X to an orthogonal matrix with orthonormal column(s) that span the same subspace as X's columns and F is a $N_t$ by $N_t$ transformation matrix.

20. The non-transitory machine-accessible medium of claim 19, wherein said adaptive codebook is transformed from a codebook so that codewords concentrate at average directions for reducing quantization error.

* * * * *